T. L. BAYLIES.
INKING APPARATUS FOR COLOR PRINTING.
No. 79,888. Patented July 14, 1868.
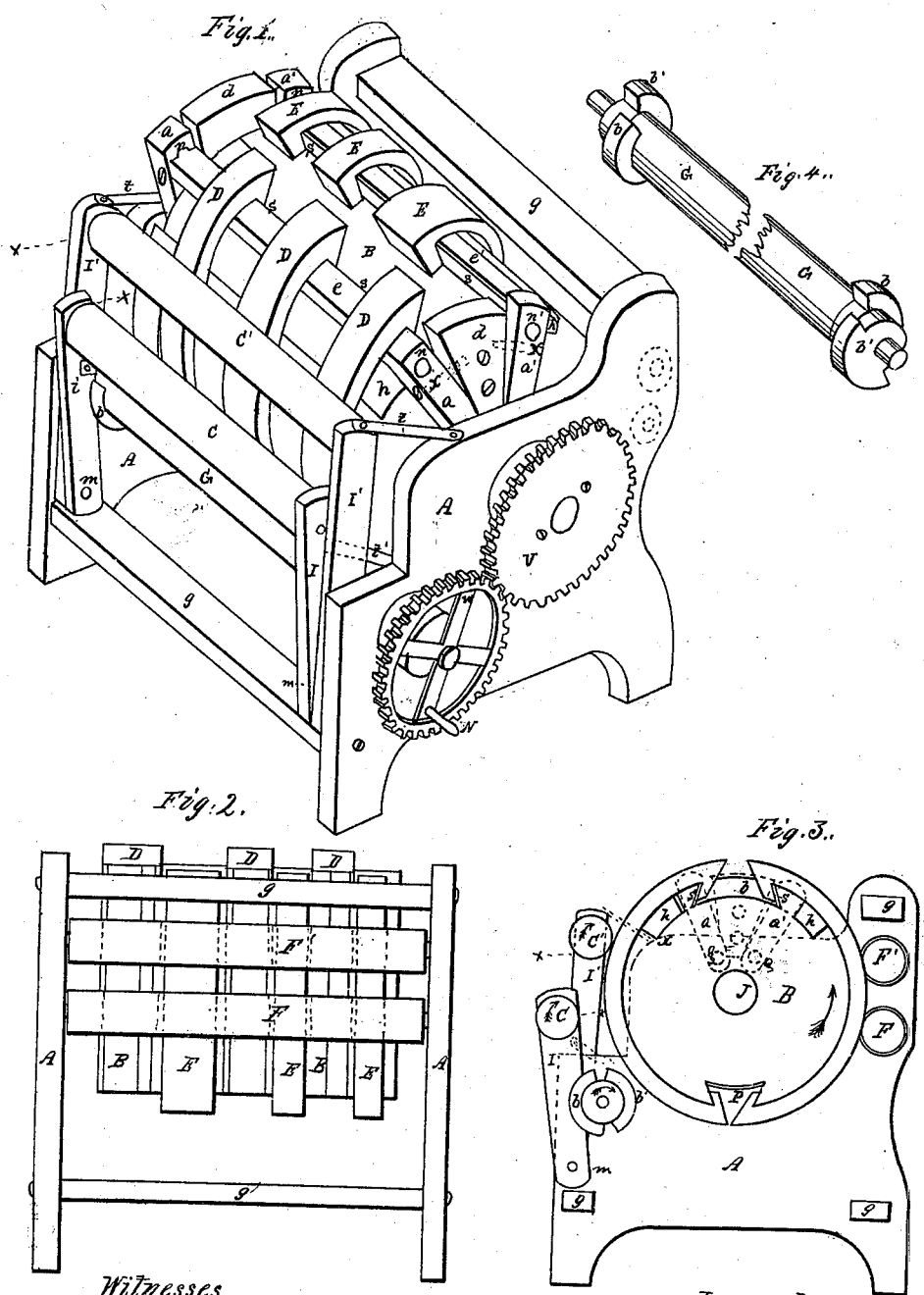

United States Patent Office.

THOMAS L. BAYLIES, OF RICHMOND, INDIANA, ASSIGNOR, BY MESNE ASSIGNMENT, TO THE AMERICAN PATENT CHROMATIC-PRINTING-PRESS COMPANY.

Letters Patent No. 79,888, dated July 14, 1868.

IMPROVEMENT IN INKING-APPARATUS FOR COLOR-PRINTING.

The Schedule referred to in these Letters Patent and making part of the same.

TO ALL WHOM IT MAY CONCERN:

Be it known that I, THOMAS L. BAYLIES, of the city of Richmond, and State of Indiana, have invented a new and useful Improvement in Inking-Apparatus; and I do hereby declare that the following is a full, clear, and exact description of the same, reference being had to the accompanying drawings, making a part of this specification, in which—

Figure 1 is a perspective view.

Figure 2, an elevation.

Figure 3, a vertical section; and

Figure 4 a perspective view of the cam-shaft G and cams $b$ $b'$ when detached from the press.

The same letters in the different figures refer to corresponding parts of the invention.

My invention relates to an apparatus to be used in connection with printing-presses for inking in different colors.

To enable others skilled in the art to make and use my invention, I will proceed to describe its construction and operation.

A and A represent the sides of the structure, framed together with beams $g$.

B is a rotating cylinder, supported on shaft J, the latter having journal-bearings in sides A.

D and E each represent a set of metallic inking-bars, secured on the surface of cylinder B, and on lines parallel to the circumference of the latter.

C and C' are inking-rollers.

F and F' are type-rollers.

The curved inking-bars D and E are made to conform in shape to the circumference of cylinder B, and are provided at their ends with barb-shaped hooks, by means of which they are secured to said cylinder.

Cylinder B is provided with a dove-tailed channel, P, across its circumference, into which one end of each "curved" bar, D and E, is hooked, as shown in fig. 3. The opposite ends of said bars are hooked on transverse bars $e$ and $e'$, which bars are pivoted at $n$ in radial bars $a$ and $a'$. The latter are pivoted at $q$, near shaft J, on the end of cylinder B. The bars $e$ and $e'$ are situated in a transverse recess, $h$, across the circumference of cylinder B, opposite channel P, the depth of which recess is equal the thickness of bars $e$.

$d$ and $d$ represent V-shaped lugs, attached to the ends of cylinder B, centrally of the recess $h$.

The bars $a$ and $a'$ are secured by screws $x$ (or in any suitable manner by which they may be readily attached) to lugs $d$ and $d$, thus tightening bars $e$ and $e'$, by which the inking-bars are held.

When bars $a$ and $a'$ are detached from lugs $d$ and $d$, the transverse bars $e$ and $e'$ are permitted to move on the surface of cylinder B, between lugs $d$ and the edges of recess $h$, thus allowing the inking-bars D and E to be readily applied to and taken from cylinder B.

The inner sides of bars $e$ and $e'$ are bevelled to suit the barb-shaped hooks at the ends of the inking-bars, by which the latter are secured.

Flexible strips, S, of rubber, or other suitable material, are inserted along the bevelled edges of bars $e$ and $e'$ and sides of channel P, on which the inking-bars are hooked, the purpose of said flexible strips being to compensate for any variation in length that may occur in said inking-bars.

The bars D and E are arranged, with their colors, alternating across cylinder B, and each set is inked in different colors by rollers C and C'. The roller C has its bearings in the upright bars I, and roller C' has its bearings in the upright bars I'. The bars supporting roller C are situated within bars I', all of which bars are hinged on bolt $m$, near the bottom.

The rollers C and C' are drawn to cylinder B by rubber springs, $t$ and $t$, attached to their tops and to sides A, or by springs of any kind suitably arranged.

G is a shaft, having journal-bearings in sides A, near each end of which shaft are situated cams $b$ and $b'$ The toothed wheel V is attached to the axle of cylinder B, and toothed wheel $u$ is attached to the journal of roller G.

Wheel $u$ is provided with a handle, N, by means of which motion is given to the rotating devices of the apparatus.

The wheels $u$ and V are equal in size, and the cams $b$ and $b'$ correspond relatively in length of their arc to the inking-bars D and E, and are so arranged on shaft G as to each correspond in position to the set of inking-bars carrying a different-colored ink.

The cams $b$ are opposite upright bars I, and cams $b'$ are opposite bars I'. Thus, as the cylinder B and shaft G are made to rotate, the cams are brought in contact with their respective bars I and I', by which the inking-rollers C and C' are each forced back from the cylinder, while the bars carrying a different-colored ink are allowed to pass in contact with the roller corresponding in color, by which they are inked. Thus the rollers are alternately allowed to come in contact with and ink the set of bars of corresponding color, while the roller of different color is held off by the cams.

The ink is applied to rollers C and C' in any ordinary manner.

Parallel lines are drawn around cylinder B, at short intervals, on its surface, by which the bars D and E may be correctly adjusted.

Having thus fully described my said invention, what I claim, and desire to secure by Letters Patent, is—

1. The combination of the central hub B, a series of adjustable inking-bars D E, and a clamp for securing the bars at the ends without the intervention of any intermediate lateral supports, substantially as set forth.

2. Interposing rubber, or other yielding material, between the inner surface of the hooks of bars D and E and their point of contact with cylinder B and longitudinal bars $e$ and $e'$, for the purpose set forth.

3. The cams $b$ and $b'$, in combination with bars I and I' and rollers C and C', substantially as described, and for the purpose set forth.

THOMAS L. BAYLIES.

Witnesses:
JOSEPH RIDGE,
E. I. SALTER.